US012083916B2

(12) United States Patent
Arlt et al.

(10) Patent No.: US 12,083,916 B2
(45) Date of Patent: Sep. 10, 2024

(54) WHEEL STOPPER DEVICE

(71) Applicant: Bayerische Motoren Werke Aktiengesellschaft, Munich (DE)

(72) Inventors: Martin Arlt, Gauting (DE); Torsten Herzog, Munich (DE); Winfried Siegl, Beilngries (DE); Armin Wagner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 569 days.

(21) Appl. No.: 17/299,419

(22) PCT Filed: Nov. 29, 2019

(86) PCT No.: PCT/EP2019/083128
§ 371 (c)(1),
(2) Date: Jun. 3, 2021

(87) PCT Pub. No.: WO2020/114914
PCT Pub. Date: Jun. 11, 2020

(65) Prior Publication Data
US 2022/0055493 A1 Feb. 24, 2022

(30) Foreign Application Priority Data
Dec. 5, 2018 (DE) ...................... 10 2018 131 001.3

(51) Int. Cl.
*B60L 53/36* (2019.01)
*B60L 53/12* (2019.01)
(Continued)

(52) U.S. Cl.
CPC ............... *B60L 53/36* (2019.02); *B60L 53/12* (2019.02); *B60L 53/38* (2019.02); *B60L 53/65* (2019.02); *G08G 1/142* (2013.01); *G08G 1/146* (2013.01)

(58) Field of Classification Search
CPC .......... B60L 53/36; B60L 53/12; B60L 53/38; B60L 53/65; B60L 53/30; B60L 53/305;
(Continued)

(56) References Cited

U.S. PATENT DOCUMENTS 3,849,936 A * 11/1974 Geraci ................. E01F 13/085
49/35
9,780,574 B2 * 10/2017 Niizuma ................. H02J 50/12
(Continued)

FOREIGN PATENT DOCUMENTS

CN   103210562 A   7/2013
CN   205508164 U   8/2016
(Continued)

OTHER PUBLICATIONS

PCT/EP2019/083128, International Search Report dated Jul. 9, 2020 (Two (2) pages).
(Continued)

*Primary Examiner* — Ryan W Sherwin
(74) *Attorney, Agent, or Firm* — Crowell & Moring LLP

(57) ABSTRACT

A wheel stopper device includes a housing which is configured to be placed on a ground surface and to be approached and/or driven over by a motor vehicle non-destructively, a communication module which is configured to receive control data from an external unit, a lighting element which is disposed in or on the housing and is configured to emit light which is visible in an environment of the wheel stopper device, and a control unit which is configured to operate the lighting element on a basis of the control data.

15 Claims, 2 Drawing Sheets

(51) Int. Cl.
    *B60L 53/38*     (2019.01)
    *B60L 53/65*     (2019.01)
    *G08G 1/14*     (2006.01)

(58) Field of Classification Search
    CPC .......... B60L 53/53; B60L 53/60; B60L 53/62;
              B60L 53/68; G08G 1/142; G08G 1/146;
               Y02T 10/70; Y02T 10/7072; Y02T 90/12;
                        Y02T 90/14; Y02T 90/16
    See application file for complete search history.

(56) References Cited

U.S. PATENT DOCUMENTS

| | | | | |
|---|---|---|---|---|
| 10,329,105 | B2* | 6/2019 | Hoofard | B65G 69/005 |
| 10,836,269 | B2* | 11/2020 | Farkas | B60L 53/30 |
| 11,325,485 | B2* | 5/2022 | Nishimura | H02J 13/00022 |
| 2010/0098487 | A1* | 4/2010 | Zana | E01F 13/08 |
| | | | | 404/7 |
| 2011/0067960 | A1* | 3/2011 | Miki | E04H 6/426 |
| | | | | 188/32 |
| 2011/0074346 | A1 | 3/2011 | Hall et al. | |
| 2013/0013382 | A1* | 1/2013 | Alexander | G06Q 20/20 |
| | | | | 705/14.1 |
| 2015/0101222 | A1* | 4/2015 | Hochfelsen | G09F 7/18 |
| | | | | 40/541 |
| 2015/0137744 | A1* | 5/2015 | Lee | B60L 53/37 |
| | | | | 320/108 |
| 2016/0046194 | A1* | 2/2016 | Tsukamoto | B60L 53/124 |
| | | | | 307/104 |

FOREIGN PATENT DOCUMENTS

| | | | | |
|---|---|---|---|---|
| CN | 207133998 U | 3/2018 | | |
| CN | 207739181 U | 8/2018 | | |
| DE | 10 2018 007 874 A1 | 4/2019 | | |
| EP | 3 054 558 A1 | 8/2016 | | |
| JP | 2011106216 A | * 6/2011 | ............ | B60L 53/126 |
| WO | WO 2009/154787 A2 | 12/2009 | | |
| WO | WO 2011/084936 A2 | 7/2011 | | |

OTHER PUBLICATIONS

German Search Report issued in German application No. 10 2018 131 001.3 dated Jun. 7, 2019, with Statement of Relevancy (Eight (8) pages).

Chinese Office Action issued in Chinese application No. 201980079497.1 dated May 10, 2023, with English translation (Twenty (20) pages).

* cited by examiner

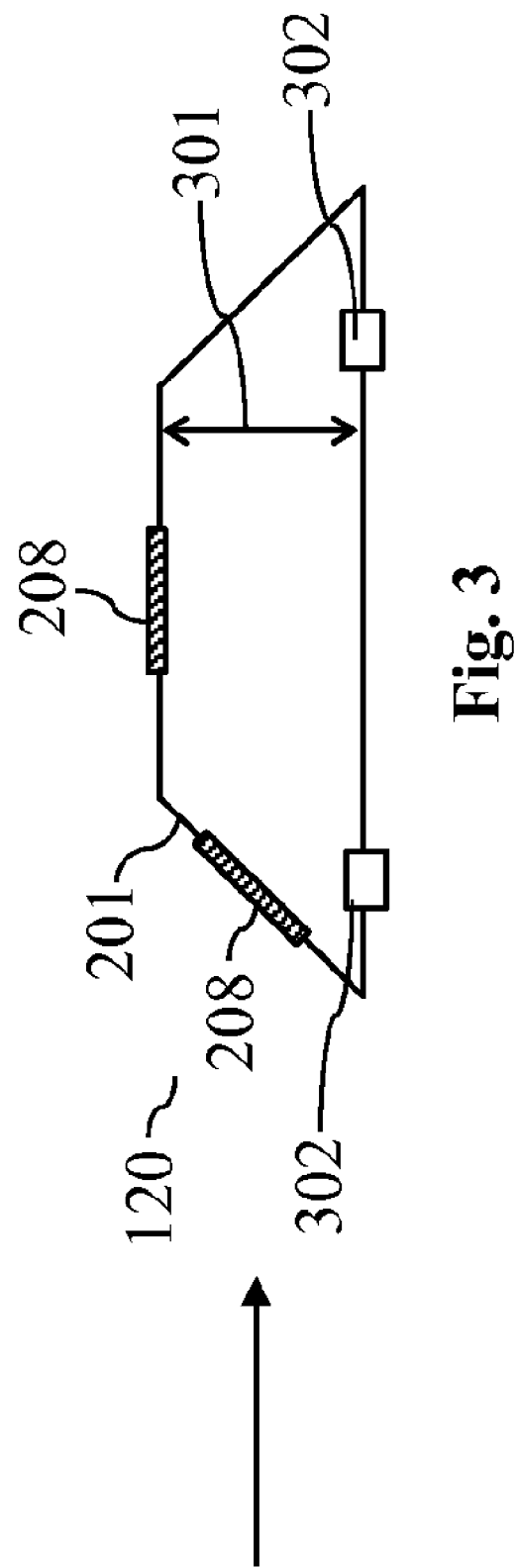

WHEEL STOPPER DEVICE

BACKGROUND AND SUMMARY OF THE INVENTION

The invention relates to a device for delimiting a parking space. In particular, the invention relates to a wheel stopper device which can be used to delimit a parking space.

An at least partially electrically driven vehicle typically comprises an electrical energy store for storing electrical energy for operating an electrical drive motor of the vehicle. The energy store can be charged at a charging station. In this case, the charging station can be configured to transmit electrical energy to the vehicle via a charging cable or inductively and/or to transmit electrical energy by means of a charging robot for an automatic charging operation.

In order to carry out a charging operation, it is typically necessary for the vehicle to be precisely positioned in a parking space of the charging station. In particular, the energy efficiency of an inductive charging operation is typically increased by virtue of the fact that the secondary coil of the vehicle is positioned directly above the ground coil of the charging station.

The present document deals with the technical object of increasing the quality and convenience of positioning a vehicle in a parking space, in particular in a parking space of a charging station.

The object is achieved by means of an independent claim. Advantageous embodiments are described, inter alia, in the dependent claims. It is pointed out that additional features of a patent claim dependent on an independent patent claim may form, without the features of the independent patent claim or only in combination with a subset of the features of the independent patent claim, a separate invention which is independent of the combination of all features of the independent patent claim and can be made the subject of an independent claim, a divisional application or a subsequent application. This applies in the same manner to technical teachings which are described in the description and can form an invention independent of the features of the independent patent claims.

One aspect describes a wheel stopper device, wherein the wheel stopper device is designed, in particular, to be used in or at a motor vehicle parking space. The device can be used to delimit a parking space in the longitudinal direction of a motor vehicle. A vehicle can drive or reverse into a parking space, to be precise until the front wheels or rear wheels of the vehicle butt against one or more wheel stopper devices positioned in the parking space. It is therefore possible to indicate to the user of a vehicle that the vehicle is as far or as deep as possible in the parking space when the front wheels or rear wheels of the vehicle butt against a wheel stopper device. Furthermore, the installation of one or more wheel stopper devices makes it possible to protect one or more objects (for example components of a charging station) which are arranged behind the one or more wheel stopper devices with respect to the direction of travel of the vehicle.

A wheel stopper device comprises a housing which is designed to be placed on the ground (in particular on the road for a vehicle). The housing is also designed to be approached and/or driven over by a motor vehicle in a non-destructive manner. In particular, the housing may be designed to support a weight of 250 kg, 500 kg, 1000 kg, 1500 kg or more.

The wheel stopper device may have a height which runs perpendicular to the ground and is sufficiently large to cause a stopping force on at least one wheel of a motor vehicle and is sufficiently small to avoid a collision with an underbody of a motor vehicle. For example, the height of the wheel stopper device may be between 5 cm and 20 cm, in particular between 7 cm and 15 cm.

The base of the wheel stopper device facing the ground may be rectangular. The side length of the base may be, for example, 40 cm, 50 cm or more (for a side arranged perpendicular to the longitudinal direction of a vehicle) or 10 cm, 20 cm or more (for a side arranged parallel to the longitudinal direction of a vehicle).

Starting from the base, the wheel stopper device may have one or more obliquely running side surfaces. For example, a cross section of the wheel stopper device running perpendicular to the base may have a triangular shape or a trapezoidal shape (wherein that surface of the wheel stopper device which faces away from the ground is smaller than the base). The obliquely running side surface of the wheel stopper device may have an angle (with respect to the ground) of between 30° and 60°, for example.

The wheel stopper device may therefore run obliquely from the ground on at least one side, with the result that the wheel stopper device forms a wedge, in particular a drive-on wedge, for a wheel of a vehicle. A wheel of a vehicle can therefore be stopped or braked in a particularly reliable and gentle manner.

The wheel stopper device may be designed to be fastened, in particular adhesively bonded and/or screwed, to the ground. In particular, the wheel stopper device may comprise one or more fastening elements, for example one or more holes for screws, which can be used to fasten the wheel stopper device to the ground. Fastening the wheel stopper device makes it possible to reliably delimit a parking space.

The wheel stopper device also comprises a communication module which is configured to receive control data from an external unit. The communication module may be designed for wireless and/or wired communication. Preferred communication protocols are wireless communication protocols such as WLAN, Bluetooth or Zigbee.

The wheel stopper device also comprises at least one lighting element (arranged in or on the housing) which is designed to (actively) emit light which is visible in an environment of the wheel stopper device. The lighting element may comprise one or more LEDs, for example. In one preferred example, the wheel stopper device comprises a plurality of lighting elements which are arranged, for example, in a row (for example in a row transverse to the longitudinal direction of a vehicle). The individual lighting elements may be configured to be activated and deactivated. Furthermore, the color of the light emitted by a lighting element may be changed, if appropriate.

A lighting element may be designed to emit light which can be seen by a user of a vehicle at a distance of 5, 10, 20 meters or more. For example, a lighting element may be designed to emit light with a luminous flux of 50 lumen, 100 lumen, 200 lumen, 400 lumen, 800 lumen or more.

The wheel stopper device also comprises a control unit (for example having a processor) which is configured to operate the lighting element on the basis of the control data. In particular, the control unit may be configured to change one or more properties of the light emitted by the at least one lighting element on the basis of the control data.

Exemplary properties in this case are the color, the intensity and/or a flashing code generated by the lighting element.

A description is therefore given of a wheel stopper device which can be used to delimit a parking space for a motor vehicle in a reliable manner and can also be used to provide information relating to the parking space and/or relating to the motor vehicle (via the one or more lighting elements). The quality and convenience of positioning a vehicle in a parking space can therefore be increased.

The external unit, with which the wheel stopper device communicates, may be, for example, a charging station for charging an electrical energy store of a motor vehicle. The control data may then comprise state information relating to the state of the charging station and/or relating to the state of a charging operation which is carried out at the charging station.

The state information may indicate, for example: initialization of a charging operation; charging operation active; charging operation completed; fault in a charging operation; charging station available; charging station reserved; charging station reserved for a third party; charging station reserved for an approaching vehicle and/or charging station defective. The wheel stopper device can therefore be used to conveniently inform the user of a charging station of the state of the charging station and/or of a charging operation.

Alternatively or additionally, the external unit, with which the wheel stopper device communicates, may comprise or be a system for managing parking spaces. In this case, the control data may comprise availability information relating to the availability of a parking space at which the wheel stopper device is arranged. The availability information may indicate, for example: parking space available; parking space occupied; parking space reserved; parking space reserved for a third party; parking space reserved for an approaching vehicle and/or presence of a fault. The wheel stopper device can therefore be used to conveniently inform the user of a parking lot, which has a multiplicity of parking spaces, of the state of the individual parking spaces.

The wheel stopper device may comprise an electrical energy store or a battery for supplying energy to components of the wheel stopper device (for example inside the housing). In this case, the electrical energy store of the wheel stopper device may be designed to supply the components of the wheel stopper device with electrical energy for a period of one month, six months, one year or more. Providing an energy store or a battery makes it possible to autonomously operate the wheel stopper device. It is therefore possible to efficiently install and operate wheel stopper devices.

The electrical energy store of the wheel stopper device may be rechargeable. Furthermore, the wheel stopper device may comprise, on the housing, a charging interface (for example a USB interface) for charging the electrical energy store. It is therefore possible to operate wheel stopper devices in a particularly efficient manner.

The wheel stopper device may comprise an occupancy sensor which is configured to capture sensor data relating to an environment of the wheel stopper device arranged above the wheel stopper device (if the wheel stopper device is placed on the ground). On the basis of the occupancy sensor, it is possible to detect, for example, whether or not a vehicle is above the occupancy sensor. The occupancy of a parking space can therefore be detected. The control unit may be configured to transmit the sensor data from the occupancy sensor to an external unit via the communication module, for example in order to automatically determine and, if necessary, invoice the parking duration of a vehicle. Alternatively or additionally, the control unit may be configured to operate the at least one lighting element on the basis of the sensor data, for example in order to indicate whether or not a parking space is occupied. The convenience and quality of an operation of parking a vehicle can be increased further by providing an occupancy sensor.

The housing may comprise a protective material (for example rubber, in particular hard rubber) and/or may be at least partially coated with a protective material. The protective material may be elastic, if appropriate. In particular, the protective material may be ductile or non-brittle. The wheel stopper device and vehicles may thus be reliably protected from damage. In particular, use of a protective material makes it possible to reliably avoid the wheel stopper device from breaking or being damaged when a vehicle drives over it and/or in the event of a collision with a vehicle. The protective material may be translucent at least in certain areas, with the result that the light from the at least one lighting element can shine through the protective material. The components of the wheel stopper device can therefore be reliably protected from environmental influences. In this case, the wheel stopper device may also be dustproof and watertight (for example according to IP69K).

As already stated above, the wheel stopper device preferably comprises a plurality of lighting elements (which can each be individually controlled or operated). The control unit may be configured to set a lighting scenario of the lighting elements on the basis of the control data. In this case, the following may be stipulated, for example, within the scope of a lighting scenario: the sequence in which light is emitted by the individual lighting elements; the duration for which light is emitted by the individual lighting elements; and/or the color of the light emitted by the individual lighting elements. Providing different lighting scenarios of a plurality of lighting elements makes it possible to further increase the amount and quality of the information indicated by the wheel stopper device.

The control unit of the wheel stopper device may be configured to communicate with at least one other wheel stopper device via the communication module in order to operate the at least one lighting element of the wheel stopper device in accordance with at least one lighting element of the other wheel stopper device. Coordinated operation of a plurality of wheel stopper devices can therefore be enabled (for example for operation at a construction site and/or at an off-ramp). For example, a chaser light can be implemented by means of coordinated operation of a plurality of wheel stopper devices by sequentially activating the lighting elements of the different wheel stopper devices.

The control data may comprise position information relating to the position of an external unit (for example a vehicle) relative to the wheel stopper device. The control unit may be configured to effect a lighting scenario of the one or more lighting elements on the basis of the position information and on the basis of a desired position for the external unit. In this case, the lighting scenario can be used to indicate to a user of the external unit how the position of the external unit should be changed in order to achieve the desired position. The wheel stopper device can therefore be used as an active navigation aid during a positioning operation. The quality and convenience in a positioning operation can therefore be increased further.

The control unit may be configured to receive control data from a motor vehicle, which control data indicate that the motor vehicle is approaching the wheel stopper device. For example, the control data may comprise position information relating to an approaching motor vehicle. Furthermore, the control data may comprise identification information for identifying the approaching motor vehicle. On the basis of the control data, the control unit, for example, can detect that a motor vehicle, which has reserved the parking space in which the wheel stopper device is located, is approaching the parking space or the wheel stopper device.

The control unit may also be configured, in response to this, to cause the lighting element to output an optical indication to the driver of the approaching motor vehicle. In particular, it is possible to output an optical indication which indicates that the parking space or the charging station, in or on which the wheel stopper device is arranged, is reserved for the approaching motor vehicle (or that the parking space or the charging station is reserved for another motor vehicle). The driver of a vehicle can therefore be efficiently and reliably assisted with the position of the vehicle.

As a result of the one or more lighting elements in a wheel stopper device, it is therefore possible to carry out or indicate an assignment of a parking space or a charging station to a respective vehicle. If a vehicle is moving toward a plurality of parking spaces or charging stations (and (WLAN) coupling to the wheel stopper device of a parking space or a charging station has already been carried out, if appropriate (for example at a distance of 10-15 m)), the parking space assigned to the vehicle or the charging station assigned to the vehicle can nevertheless be indicated to the driver of the vehicle via the one or more lighting elements of at least one wheel stopper device. In particular, the charging station or the parking space or the wheel stopper device to which the vehicle is coupled can be indicated to the driver or the vehicle.

A further aspect describes a parking space for a motor vehicle. The parking space comprises a ground area on which a motor vehicle can be parked. The ground area may have, for example, a length (in the longitudinal direction of the vehicle) of between 5 and 6 meters and a width (in the transverse direction of the vehicle) of between 2 and 3.5 meters.

The parking space may have at least one wheel stopper device described in this document. In this case, the wheel stopper device may delimit the ground area or the parking space on at least one side, in particular on a side which delimits the parking space in the longitudinal direction of a motor vehicle.

A further aspect describes a charging station for charging an electrical energy store of a motor vehicle (for example an automobile, a truck or a bus). The charging station comprises at least one parking space described in this document. The charging station also comprises a charging unit, in particular having a ground coil, for providing electrical energy for a charging operation.

It should be noted that the devices and systems described in this document can be used both alone and in combination with other devices and systems described in this document. Furthermore, any aspects of the devices and systems described in this document can be combined with one another in various ways. In particular, the features of the claims can be combined with one another in various ways.

The invention is described in more detail below on the basis of exemplary embodiments.

BRIEF DESCRIPTION OF THE DRAWINGS

FIG. 3 shows a side view of an exemplary wheel stopper device.

DETAILED DESCRIPTION OF THE DRAWINGS

Figure 1:
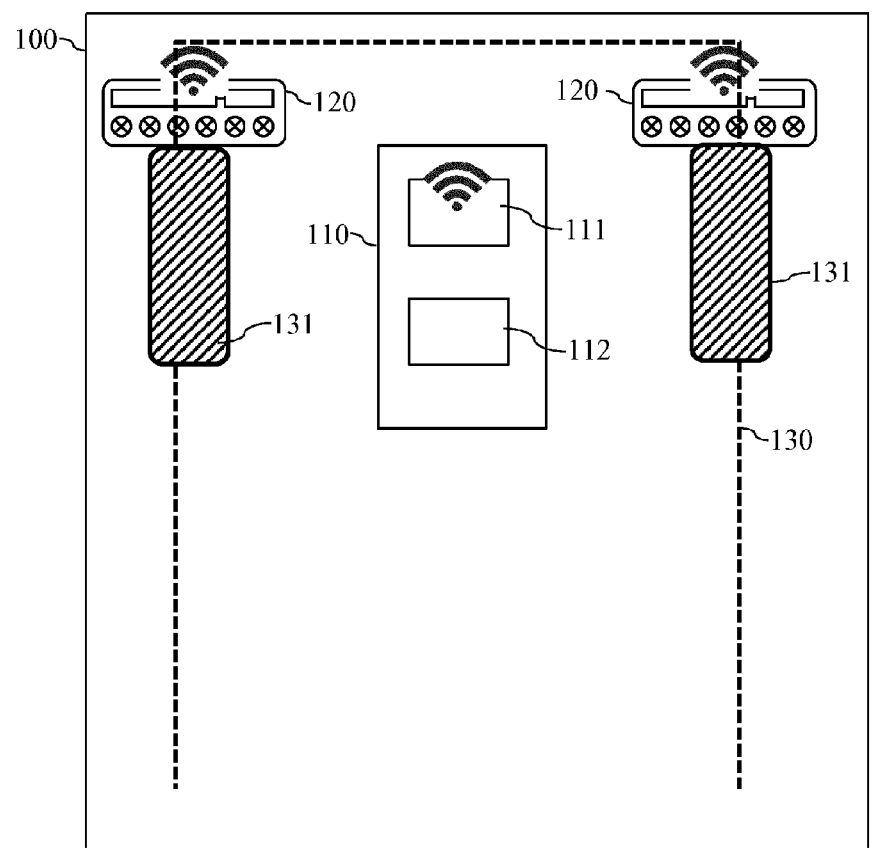
FIG. 1 shows an exemplary parking lot having wheel stopper devices.

As stated at the outset, the present document deals with the convenient and precise positioning of a vehicle in a parking space of a parking lot. In this context, FIG. 1 shows an exemplary parking space 100. The parking space 100 may be part of a charging station for charging the electrical energy store of a vehicle 130. In the example illustrated, a ground unit 110 for inductive charging is arranged on the ground of the parking space 100. The ground unit 110 comprises a charging coil 112 which is configured to generate a magnetic charging field. The ground unit 110 also comprises a control module 111 which is configured to control a charging operation and/or is configured to communicate with other units (for example with the vehicle 130) (for example via a wireless communication connection).

For an inductive charging operation, a vehicle 130 should be precisely positioned above the ground unit 110, in particular above the charging coil 112. The parking space 100 may have one or more wheel stopper devices 120 which are each designed such that the wheels 131 of a vehicle 130 can drive against the respective wheel stopper device 120 without the vehicle 130 and/or the wheel stopper device 120 being damaged in the process. The one or more wheel stopper devices 120 may be arranged in such a manner that the vehicle 130 has advantageous, in particular optimum, positioning with respect to the ground unit 110 when the wheels 131 of the vehicle 130 touch the one or more wheel stopper devices 120. Installing one or more wheel stopper devices 120 in a parking space 100 therefore makes it possible to increase the quality and convenience of positioning a vehicle 130 (in particular an automobile).

Figure 2:
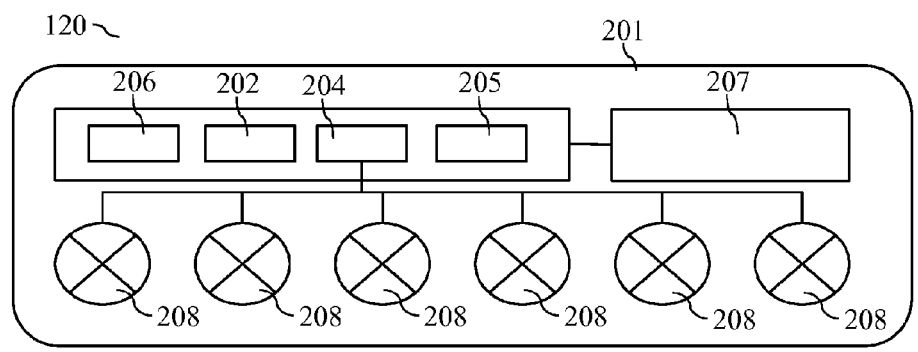
FIG. 2 shows an exemplary wheel stopper device.

FIG. 2 shows exemplary components of a wheel stopper device 120. The wheel stopper device 120 typically has a housing 201 which is stable such that the housing 201 can support the typical weight of a vehicle 130 (for example 250 kg, 500 kg, 1000 kg, 1500 kg, 2000 kg or more). The housing 201 may also have an (elastic and/or ductile or non-brittle) material (for example may be coated with such a material at least in certain areas) in order to at least partially dampen the collision with the wheel 131 of a vehicle 130 (and in order to thereby avoid damage to the wheel 131).

The housing 201 may be designed to be fastened (for example adhesively bonded or screwed) to the ground of a parking space 100. For this purpose, the underside or base of the housing 201 may be flat. One or more fastening elements 302 (for example screws) can also be arranged on the underside of the housing 201 and can be used to fasten the housing 201 to the ground of a parking space 100 (see FIG. 3).

One or more controllable lighting elements 208 may be arranged in or on the housing 201 of the wheel stopper device 120 and are each configured to actively generate and emit light. In this case, a lighting element 208 may be activatable and deactivatable, wherein no actively generated light is emitted by the deactivated lighting element 208 and actively generated light is emitted by the activated lighting element 208.

If appropriate, a lighting element 208 may be configured to emit light in different colors. A lighting element 208 may also be configured to generate one or more different flashing codes. A lighting element 208 may have, for example, one or more LEDs (light-emitting diodes). A lighting element 208 may be used to optically indicate information relating to a parking space 100 and/or relating to a charging station.

The wheel stopper device 120 also comprises an electrical energy store or a battery 207 which is configured to store electrical energy for operating the wheel stopper device 120. The energy store may comprise, for example, one or more lithium-ion-based storage cells. The energy store 207 may be replaceable and/or rechargeable (for example via a charging interface, for example a USB interface, on the housing 201 of the wheel stopper device 120). A wheel stopper device 120 can be operated in an autonomous and flexible manner by providing an electrical energy store 207.

The wheel stopper device 120 also comprises a driver 204 for controlling the one or more lighting elements 208 (for example an LED driver). The wheel stopper device 120 can also comprise a communication module 205 which makes it possible for the wheel stopper device 120 to interchange data with an external unit (for example with a vehicle 130 or with a charging station, for instance the ground unit 110, or with a smartphone belonging to a user) via a (wireless) communication connection. Exemplary communication connections are WLAN, Bluetooth, Zigbee, etc.

The wheel stopper device 120 may also comprise an occupancy sensor 206 which is configured to capture sensor data relating to the environment of the wheel stopper device 120. The sensor data may indicate, in particular, information relating to the distance to an object (for example the underbody of a vehicle 130) above the wheel stopper device 120. The occupancy sensor 206 may use one or more measurement principles, in particular capacitive, inductive, physical pressure, ultrasound, optical, etc.

The wheel stopper device 120 also comprises a control unit 202 which is configured to control the state of the one or more lighting elements 208 and/or to control data interchange via the communication module 205 and/or to evaluate the sensor data from the occupancy sensor 206.

In particular, the control unit 202 may be configured to determine a state of the charging station, at which the wheel stopper device 120 is arranged, on the basis of a message received via the communication module 205. The one or more lighting elements 208 may then be prompted to optically present the determined state of the charging station (for example via the color of the one or more lighting elements 208).

Alternatively or additionally, the control unit 202 may be configured to determine, on the basis of the sensor data from the occupancy sensor 206, whether or not a vehicle 130 is situated above the wheel stopper device 120. The underbody height of the vehicle 130 can also be determined, if appropriate, on the basis of the sensor data from the occupancy sensor 206. Information relating to the underbody height can be transmitted via the communication module 205 (for example to the charging station). Furthermore, the one or more lighting elements 208 may be controlled on the basis of the sensor data from the occupancy sensor 206.

The control unit 202 of a first wheel stopper device 120 may be configured to communicate with a second wheel stopper device 120 via the communication module 205. As part of the communication, the control of the one or more lighting elements 208, for example, can be agreed between the wheel stopper devices 120, for instance in order to activate the lighting elements 208 of the different wheel stopper devices 120 in temporal succession (for example for a running display).

The control unit 202 of a wheel stopper device 120 may be configured to communicate with a personal electronic device (for example a smartphone) via the communication module 205. For example, it may be possible for a user to control the wheel stopper device 120 via an electronic device, for instance via a smartphone (for example by means of a specific software application).

The control unit 202 may be configured to receive position information relating to the position of the external unit relative to the wheel stopper device 120 from an external unit (for example from a vehicle 130). The position information can indicate the distance and/or the orientation angle between the external unit and the wheel stopper device. The one or more lighting elements 208 can then be controlled on the basis of the position information. For example, the one or more lighting elements 208 can be used to provide a positioning aid for the external unit in order to make it possible for a user of the external unit to precisely position the external unit relative to the wheel stopper device 120.

A parking boundary which cannot be driven over or a wheel stopper device 120 is therefore described, wherein the device 120 comprises a control unit 202 (for example having a microcontroller) and one or more lighting elements 208. The control signals for one or more lighting scenarios of the one or more lighting elements 208 can be received from an external unit (for example from a charging station or from a charging unit 110) (for example via a wireless or wired communication connection). The installation of a battery 207 and a wireless communication module 205 enables wireless operation of the parking boundary or device 120.

The one or more lighting elements 208 can be used to indicate information relating to the state of a charging operation (for example initialization, charging, charging completed, fault). Alternatively or additionally, the one or more lighting elements 208 may be used to indicate information relating to the status of a parking space 100 (for example free, occupied, reserved, fault). Alternatively or additionally, the one or more lighting elements 208 may be used to indicate information relating to the status of one or more further external devices (for example function okay, functional status A, functional status B, malfunction, etc.).

The parking boundary or the device 120 may have an occupancy sensor 206 which provides sensor data which can be used to determine whether or not a vehicle 130 is situated in the environment (for example at a distance of 30 cm or less) of the parking boundary or the device 120. This information can be made available to an external unit via the communication module 205.

The device 120 described in this document can be used to flexibly illuminate construction sites and/or freeway on-ramps and off-ramps. For this purpose, a series of devices 120 can be coupled to one another (via the respective communication modules 205) in order to generate lighting scenarios which are matched to one another (for example the sequential activation of lighting elements 208 in the series of devices 120 in terms of time).

FIG. 3 shows an exemplary wheel stopper device 120 from the side (for example a cross section perpendicular to a base of the wheel stopper device 120). The wheel stopper device 120 may have a height 301 which is sufficiently low to prevent a collision of the wheel stopper device 120 with the underbody of a vehicle 130 and is sufficiently large to reliably stop a vehicle 130 if a wheel 131 of the vehicle 130 drives against the wheel stopper device 120 (illustrated by means of an arrow in FIG. 3). The wheel stopper device 120 may be fastened (in particular screwed) to the ground underneath it (for example to a road) by means of one or more fastening elements 302.

The housing 201 of the wheel stopper device 120 may run obliquely on at least one side (facing a vehicle 130), with the result that the housing 201 forms a wedge for the wheel 131 of a vehicle 130. The one or more lighting elements 208 may be arranged on an obliquely running surface in order to increase the visibility of the light emitted by the one or more lighting elements 208. Alternatively or additionally, one or more lighting elements 208 may be arranged on a top side of the housing 201.

The present invention is not restricted to the exemplary embodiments shown. In particular, it should be noted that the description and the figures are intended to illustrate only the principle of the provided devices and systems.

What is claimed is:

1. A wheel stopper device, comprising:
   a housing which is configured to be placed on a ground surface and to be approached and/or driven over by a motor vehicle non-destructively;
   a communication module which is configured to receive control data from an external unit;
   a lighting element which is disposed in or on the housing and is configured to emit light which is visible in an environment of the wheel stopper device;
   a control unit which is configured to operate the lighting element on a basis of the control data; and
   an electrical energy store configured to supply electrical energy to a component of the wheel stopper device for a period of one month, six months, one year, or more than one year.

2. The wheel stopper device according to claim 1, wherein:
   the external unit is a charging station for charging an electrical energy store of the motor vehicle;
   the control data comprise state information relating to a state of the charging station and/or relating to a state of a charging operation; and
   the state information indicates initialization of the charging operation, that the charging operation is active, that the charging operation is completed, a fault in the charging operation, that the charging station is available, that the charging station is reserved, that the charging station is reserved for a third party, that the charging station is reserved for an approaching vehicle, and/or that the charging station is defective.

3. The wheel stopper device according to claim 1, wherein:
   the external unit comprises a system for managing a parking space;
   the control data comprise availability information relating to an availability of a parking space at which the wheel stopper device is disposed; and
   the availability information indicates that the parking space is available, that the parking space is occupied, that the parking space is reserved, that the parking space is reserved for a third party, that the parking space is reserved for an approaching vehicle, and/or a presence of a fault.

4. The wheel stopper device according to claim 1 wherein the electrical energy store is rechargeable and wherein a charging interface for charging the electrical energy store is disposed on the housing.

5. The wheel stopper device according to claim 1 further comprising an occupancy sensor configured to capture sensor data relating to an environment of the wheel stopper device that is disposed above the wheel stopper device, wherein the control unit is configured to transmit the sensor data to the external unit via the communication module and/or to operate the lighting element on a basis of the sensor data.

6. The wheel stopper device according to claim 1, wherein:
   the wheel stopper device has a height which runs perpendicular to the ground surface, which is able to cause a stopping effect on a wheel of the motor vehicle, and which is able to avoid a collision with an underbody of the motor vehicle; and/or
   the height is between 5 cm and 20 cm; and/or
   the wheel stopper device runs obliquely from the ground surface on at least one side such that the wheel stopper device forms a wedge for the wheel of the motor vehicle.

7. The wheel stopper device according to claim 1, wherein:
   the wheel stopper device is configured to be fastened to the ground surface; and/or
   the wheel stopper device includes a fastening element which can fasten the wheel stopper device to the ground surface.

8. The wheel stopper device according to claim 1, wherein:
   the housing comprises a ductile material and/or is at least partially coated with the ductile material; and/or
   the ductile material is translucent at least in areas such that light emitted from the lighting element can shine through the ductile material.

9. The wheel stopper device according to claim 1, wherein:
   the control unit is configured to change a property of light emitted by the lighting element on a basis of the control data; and
   the property is a color, an intensity, or a flashing code.

10. The wheel stopper device according to claim 1 further comprising a plurality of lighting elements, wherein the control unit is configured to set a lighting scenario of the plurality of lighting elements on a basis of the control data, and wherein the lighting scenario comprises a sequence in which light is emitted by individual lighting elements of the plurality of lighting elements, a duration for which light is emitted by the individual lighting elements, and/or a color of light emitted by the individual lighting elements.

11. The wheel stopper device according to claim 1, wherein the control unit is configured to communicate with another wheel stopper device via the communication module in order to operate the lighting element in accordance with a lighting element of the another wheel stopper device.

12. The wheel stopper device according to claim 1 further comprising a plurality of lighting elements which are arranged in a row, wherein the control data comprise position information relating to a position of the external unit relative to the wheel stopper device and the control unit is configured to effect a lighting scenario of the plurality of lighting elements on a basis of the position information and on a basis of a desired position, wherein the lighting scenario indicates to a user of the external unit how the position of the external unit should be changed in order to achieve the desired position.

13. The wheel stopper device according to claim 1, wherein the control unit is configured to:
   receive control data from the motor vehicle, wherein the control data from the motor vehicle indicate that the motor vehicle is approaching the wheel stopper device; and
   in response to receiving control data from the motor vehicle, cause the lighting element to output an optical indication to a driver of the motor vehicle that indicates that a parking space in which the wheel stopper device is disposed is reserved for the motor vehicle.

14. A parking space system for a motor vehicle, comprising:
   a ground area on which the motor vehicle can be parked; and
   the wheel stopper device according to claim 1, wherein the wheel stopper device delimits the ground area on a side which delimits the parking space in a longitudinal direction of the motor vehicle.

15. A charging station for charging an electrical energy store of a motor vehicle, comprising:
the parking space system according to claim 14; and
a charging unit having a ground coil or a charging robot for providing electrical energy.

* * * * *